(12) United States Patent
Newman et al.

(10) Patent No.: US 11,488,110 B2
(45) Date of Patent: Nov. 1, 2022

(54) TARGETING DELIVERY OF RECRUITING MESSAGES

(71) Applicant: ADP, LLC, Roseland, NJ (US)

(72) Inventors: Kurt D. Newman, Columbus, GA (US); Debashis Ghosh, Charlotte, NC (US); Ramsay Cole, Brooklyn, NY (US)

(73) Assignee: ADP, Inc., Roseland, NJ (US)

( * ) Notice: Subject to any disclaimer, the term of this patent is extended or adjusted under 35 U.S.C. 154(b) by 1172 days.

(21) Appl. No.: 16/011,477

(22) Filed: Jun. 18, 2018

(65) Prior Publication Data

US 2019/0385124 A1   Dec. 19, 2019

(51) Int. Cl.
| | |
|---|---|
| *G06Q 10/10* | (2012.01) |
| *G06N 3/04* | (2006.01) |
| *G06N 3/08* | (2006.01) |

(52) U.S. Cl.
CPC ....... *G06Q 10/1053* (2013.01); *G06N 3/0472* (2013.01); *G06N 3/08* (2013.01); *G06Q 10/1091* (2013.01)

(58) Field of Classification Search
CPC .... G06N 3/08; G06N 3/0472; G06Q 10/1091; G06Q 10/1053
See application file for complete search history.

(56) References Cited

U.S. PATENT DOCUMENTS

| | | | |
|---|---|---|---|
| 5,978,768 A * | 11/1999 | McGovern | G06Q 10/1053 705/321 |
| 6,662,194 B1 | 12/2003 | Joao | |
| 7,310,626 B2 * | 12/2007 | Scarborough | G06Q 10/10 706/14 |
| 7,424,438 B2 | 9/2008 | Vianello | |
| 2002/0128892 A1 | 9/2002 | Farenden | |
| 2002/0128893 A1 | 9/2002 | Farenden | |
| 2002/0128894 A1 | 9/2002 | Farenden | |
| 2003/0177027 A1 | 9/2003 | DiMarco | |
| 2006/0100919 A1 | 5/2006 | Levine | |
| 2006/0155636 A1 | 7/2006 | Hermann et al. | |
| 2006/0178896 A1 | 8/2006 | Sproul | |
| 2013/0166358 A1 * | 6/2013 | Parmar | G06Q 10/06393 705/7.39 |
| 2013/0290207 A1 * | 10/2013 | Bonmassar | G06Q 10/1053 705/321 |
| 2019/0019160 A1 * | 1/2019 | Champaneria | G06F 40/295 |
| 2019/0236204 A1 * | 8/2019 | Canim | G10L 15/16 |

OTHER PUBLICATIONS

Stokes, "What Is the Meaning of Selective Recruitment?", Bizfluent, Sep. 26, 2017, 3 pages.

* cited by examiner

*Primary Examiner* — George Giroux
(74) *Attorney, Agent, or Firm* — Yee & Associates, P.C.

(57) ABSTRACT

A method, computer system, and computer program product for on-demand job messaging to predicted employees. A machine intelligence application compares data for an employee to a job change interest model. Responsive to comparing the data for the employee to the job change interest model, the machine intelligence application determines whether the employee is a predicted employee. The predicted employee enables improved targeting of job messaging by a job messaging application in a computer system.

15 Claims, 8 Drawing Sheets

TARGETING DELIVERY OF RECRUITING MESSAGES

BACKGROUND INFORMATION

1. Field

The present disclosure relates generally to an improved computer system and, in particular, to a method and apparatus for accessing information in a computer system. Still more particularly, the present disclosure relates to a method and apparatus for targeting delivery of recruiting messages.

2. Background

Recruiters use a variety of means to find job candidates for openings in client companies. Often, the recruiters call employees at work on numbers obtained from websites or company directories. Recruiters also attend company functions to meet employees, to find out what positions employees hold, and whether one or more employees are looking to change jobs. Furthermore, recruiters may attend industry-specific gatherings, such as continuing education or professional conferences, in order to meet prospective candidates. The process is slow. At best, the process is one of hit or miss. A recruiter's success may depend on the ability to keep a file of potential candidates in a specific field so that when a client has a job opening, the recruiter may peruse a potential candidate's file, find a possible match, and call the potential candidate. Once contact is made, the recruiter often finds that the potential candidate does not desire to make a change, or that the potential candidate is not a good fit for the employment opportunity.

Recruiters face a challenge both in finding a candidate that matches the job description and in finding a candidate that is interested in changing jobs in order to fill a position in a timely manner.

Therefore, it would be desirable to have a method and apparatus that take into account at least some of the issues discussed above, as well as other possible issues. For example, it would be desirable to have a method and apparatus that overcome the technical problem of targeting recruiting messages to interested candidates.

SUMMARY

An embodiment of the present disclosure provides a method for on-demand job messaging to predicted employees. A machine intelligence application running on a processor unit, responsive to receiving a job description for an employment opportunity, parses a predicted employee cache for one or more predicted employees having employment data matching the job description. Responsive to parsing the predicted employee cache and finding one or more matches for one or more predicted employees, the method delivers, by a job messaging application running on the processor unit, the job description to the one or more predicted employees. The predicted employee is an employee that the machine intelligence application has determined to be interested in a job change and to whom a job change interest score has been assigned in the predicted employee cache.

Another embodiment of the present disclosure is a computer system for on-demand job messaging to predicted employees. The computer system comprises a processor unit having a predicted employee cache, a data base connected to the processor unit, a number of models stored in a computer-readable medium connected to the processor unit, a job messaging application stored in the computer-readable medium, and a machine intelligence application running on the processor unit. The machine intelligence application compares data for an employee to a job change interest model selected from the number of models, responsive to comparing the data for the employee to the job change interest model, determines whether the employee is a predicted employee. Responsive to determining that the employee is a predicted employee, the machine intelligence application stores the predicted employee in the predicted employee cache, wherein the predicted employee enables improved targeting of job messaging by the job messaging application in the computer system.

Another embodiment of the present disclosure provides a computer program product for on-demand job messaging to predicted employees. Computer-readable instructions are configured to cause a processor to compare, by a machine intelligence application, data for an employee to a job change interest model. Computer-readable instructions are configured to cause a processor, responsive to comparing the data for the employee to the job change interest model, to determine whether the employee is a predicted employee. Computer-readable instructions configured to cause a processor, responsive to a determination by the machine intelligence application running on the processor unit that the employee is the predicted employee, to calculate a job change interest score for the predicted employee. Computer-readable instructions are configured to cause a processor to provide the job change interest score to a predicted employee cache. The predicted employee enables improved targeting of job messaging by a job messaging application in a computer system.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

Figure 1:
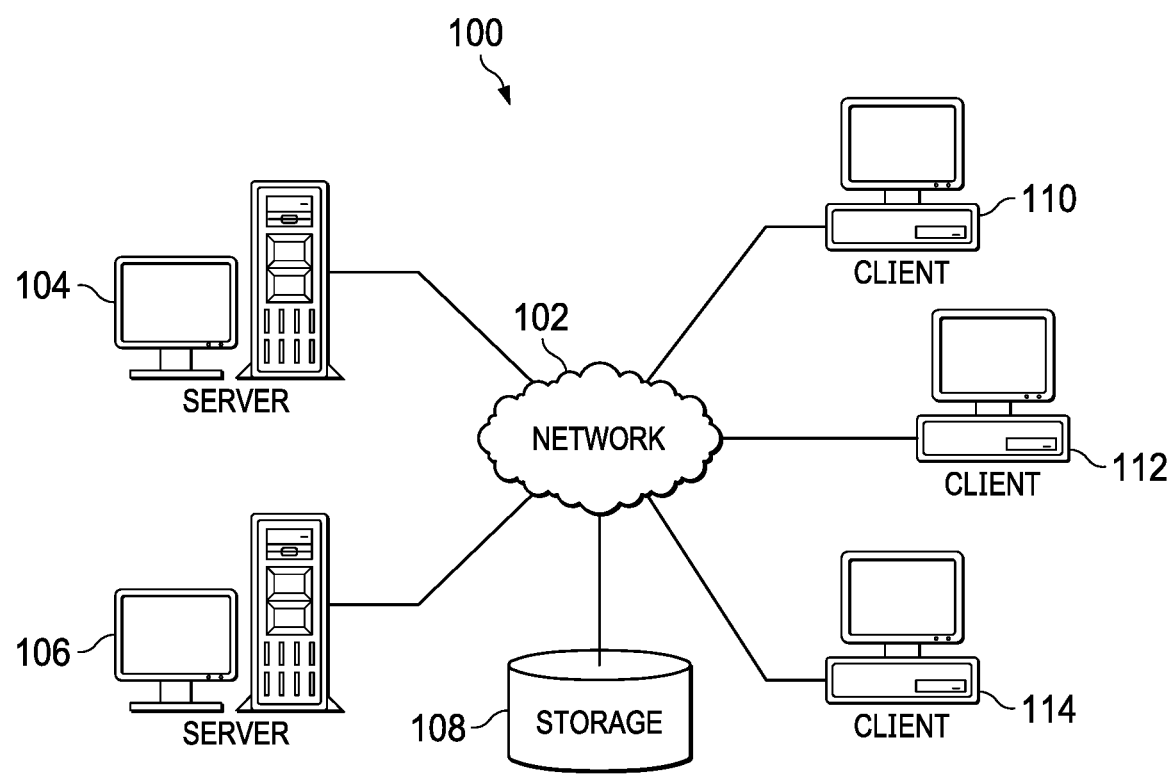
FIG. 1 is an illustration of a diagram of a data processing environment in accordance with an illustrative embodiment.

The illustrative embodiments recognize and take into account one or more different considerations. For example, the illustrative embodiments recognize and take into account that recruiters need to get messages to candidates that have desired skills. Furthermore, the illustrative embodiments recognize and take into account that the recruiters desire to get messages to candidates that may be interested in changing jobs.

The illustrative embodiments further recognize and take into account that a person that is currently employed may or may not be interested in changing jobs. The person's desire to change or not change jobs may be affected by a number of factors or indices, such as a geographic location, an industry of employment, a job title, a tenure, a pay range across geographic boundaries, a desire for upward mobility, a size of family, an education level, and other factors that may affect a qualified employee's desire to change jobs.

Therefore, the illustrative embodiments recognize and take into account that recruiting employees to vacant job positions appears to require a degree of clairvoyance on the part of a recruiter in order to know which potential candidates should be expected to desire a change. Thus, a method and apparatus that would allow for a prediction of which potential candidates are more likely to desire a job change would fill a long-felt need in the field of recruiting.

Furthermore, the illustrative embodiments recognize and take into account that a method and apparatus that could employ machine intelligence to predict candidates with an interest in a job change would require data regarding a large number of employees across a wide number of geographic areas and industries. Therefore, the illustrative embodiments recognize and take into account that a company that provides payroll services to a large number of companies in different industries and spread over across a large geographic area may have a vast amount of data that could be mined in order to produce a list of predicted candidates for job openings, and since payroll data is current and up-to-date at all times, a system employing machine intelligence may provide predicted candidates to a recruiter client in real-time.

The illustrative embodiments recognize and take into account that a system employing machine intelligence to provide a list of predicted employees to a recruiter client may employ a messaging application to send recruiting messages to the list of predicted employees. Furthermore, the illustrative embodiments recognize and take into account that such targeted messages would fill a long-felt need for recruiters to reach interested candidates within hours or minutes, instead of days.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added, in addition to the illustrated blocks, in a flowchart or block diagram.

As used herein, the phrase "at least one of," when used with a list of items, means different combinations of one or more of the listed items may be used and only one of each item in the list may be needed. In other words, "at least one of" means any combination of items and number of items may be used from the list, but not all of the items in the list are required. The item may be a particular object, thing, or a category.

For example, without limitation, "at least one of item A, item B, or item C" may include item A, item A and item B, or item B. This example also may include item A, item B, and item C or item B and item C. Of course, any combinations of these items may be present. In some illustrative examples, "at least one of" may be, for example, without limitation, two of item A, one of item B, and ten of item C; four of item B and seven of item C; or other suitable combinations.

With reference now to the figures and, in particular, with reference to FIG. 1, an illustration of a diagram of a data processing environment is depicted in accordance with an illustrative embodiment. It should be appreciated that FIG. 1 is only provided as an illustration of one implementation and is not intended to imply any limitation with regard to the environments in which the different embodiments may be implemented. Many modifications to the depicted environments may be made.

Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server computer 104 and server computer 106 connect to network 102 along with storage unit 108. In addition, client computers include client computer 110, client computer 112, and client computer 114. Client computer 110, client computer 112, and client computer 114 connected to network 102. These connections can be wireless or wired connections depending on the implementation. Client computer 110, client computer 112, and client computer 114 may be, for example, personal computers or network computers. In the depicted example, server computer 104 provides information, such as boot files, operating system images, and applications to client computer 110, client computer 112, and client computer 114. Client computer 110, client computer 112, and client computer 114 are clients to server computer 104 in this example. Network data processing system 100 may include additional server computers, client computers, and other devices not shown.

Program code located in network data processing system 100 may be stored on a computer-recordable storage medium and downloaded to a data processing system or other device for use. For example, program code may be stored on a computer-recordable storage medium on server computer 104 and downloaded to client computer 110 over network 102 for use on client computer 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers consisting of thousands of commercial, governmental, educational, and other computer systems that route data and messages. Of course, network data processing system 100 also may be implemented as a number of different types of networks, such as, for example, an intranet, a local area network (LAN), or a wide area network (WAN). FIG. 1 is intended as an example, and not as an architectural limitation for the different illustrative embodiments.

The illustration of network data processing system 100 is not meant to limit the manner in which other illustrative embodiments can be implemented. For example, other client computers may be used, in addition to or in place of client computer 110, client computer 112, and client computer 114, as depicted in FIG. 1. For example, client computer 110, client computer 112, and client computer 114 may include a tablet computer, a laptop computer, a bus with a vehicle computer, and other suitable types of clients.

In the illustrative examples, the hardware may take the form of a circuit system, an integrated circuit, an application-specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, programmable array logic, a field programmable logic array, a field programmable gate array, and other suitable hardware devices. Additionally, the processes may be implemented in organic components integrated with inorganic components and may be comprised entirely of organic components, excluding a human being. For example, the processes may be implemented as circuits in organic semiconductors.

Figure 2:
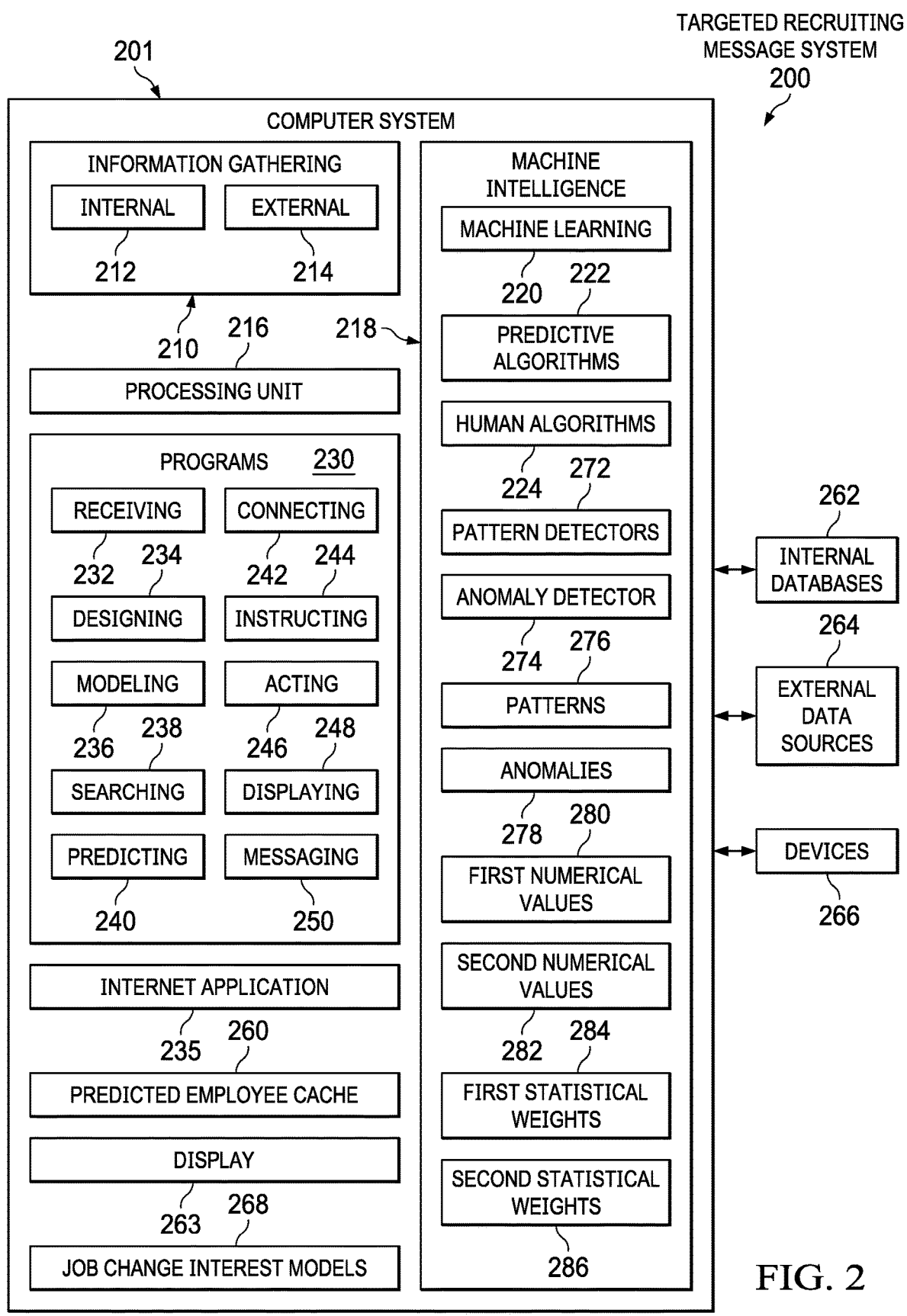
FIG. 2 is a block diagram of a targeted recruiting message system in accordance with an illustrative embodiment.

Turning to FIG. 2, a block diagram of a targeted recruiting message system is depicted in accordance with an illustrative embodiment. Targeted recruiting message system 200 comprises computer system 201, internal databases 262, external data sources 264, and devices 266.

Computer system 201 comprises information gathering 210, processing unit 216, machine intelligence 218, programs 230, predicted employee cache 260, and display 263.

Information gathering 210 comprises internal 212 and external 214. Internal 212 is configured to gather data from internal databases 262. External 214 is configured to gather data from external data sources 264. Processing unit 216 may be a processing unit, such as processor unit 804 in data processing system 800 shown later in FIG. 8.

Machine intelligence 218 comprises machine learning 220, predictive algorithms 222, human algorithms 224, pattern detectors 272, anomaly detector 274, patterns 276, anomalies 278, first numerical values 280, second numerical values 282, first statistical weights 284, and second statistical weights 286. Machine intelligence 218 can be implemented using one or more systems, such as an artificial intelligence system, a neural network, a Bayesian network, an expert system, a fuzzy logic system, a genetic algorithm, or other suitable types of systems. Machine learning 220, predictive algorithms 222, human algorithms 224, pattern detectors 272, anomaly detector 274, patterns 276, anomalies 278, first numerical values 280, second numerical values 282, first statistical weights 284, and second statistical weights 286, in addition to other elements and programs, such as programs 230, make computer system 201 a special purpose computer for targeted recruiting messaging.

Programs 230 comprise receiving 232, designing 234, modeling 236, searching 238, predicting 240, connecting 242, instructing 244, acting 246, displaying 248, and messaging 250. Receiving 232 may be configured to assist information gathering 210 in obtaining payroll data, such as payroll data 340 in FIG. 3, and employment opportunities, such as employment opportunities 318 in FIG. 3. Designing 234 may be configured for creation of input for job change interest models 268 and for identifying indicators, such as indicators 360 in FIG. 3. Modeling 236 may be configured for creation and tailoring of job change interest models, such as job change interest models 268. Searching 238 may be configured for locating predicted employees, such as predicted employees 330 in FIG. 3, and matching predicted employees with job descriptions, such as job descriptions 319 in FIG. 3 to create matched predicted employees 332 in FIG. 3.

Predicting 240 may be configured for use by machine intelligence 218 to use patterns 276 and anomalies 278, as well as first numerical values 280, second numerical values 282, first statistical weights 284, and second statistical weights 286 for calculating job change interest scores. Connecting 242 may be configured for assisting internet application 235 and connections 310 in FIG. 3 in receiving job descriptions from clients and in sending job descriptions to matched predicted employees, such as matched predicted employees 332 in FIG. 3. Instructing 244 may be configured for use by machine intelligence 218 in forming computer program code in conjunction with machine learning 220 to form improved accuracy in job change interest scores and faster calculation of job change interest scores. Acting 246 may be configured to respond to machine intelligence 218 in calling one or more of programs 230 in order to target recruiting messages to matched predicted employees. Displaying 248 may be configured to display messages and data for review by a system administrator. Messaging 250 may be a job messaging application configured to form and send messages with job descriptions to matched predicted employees.

Figure 3:
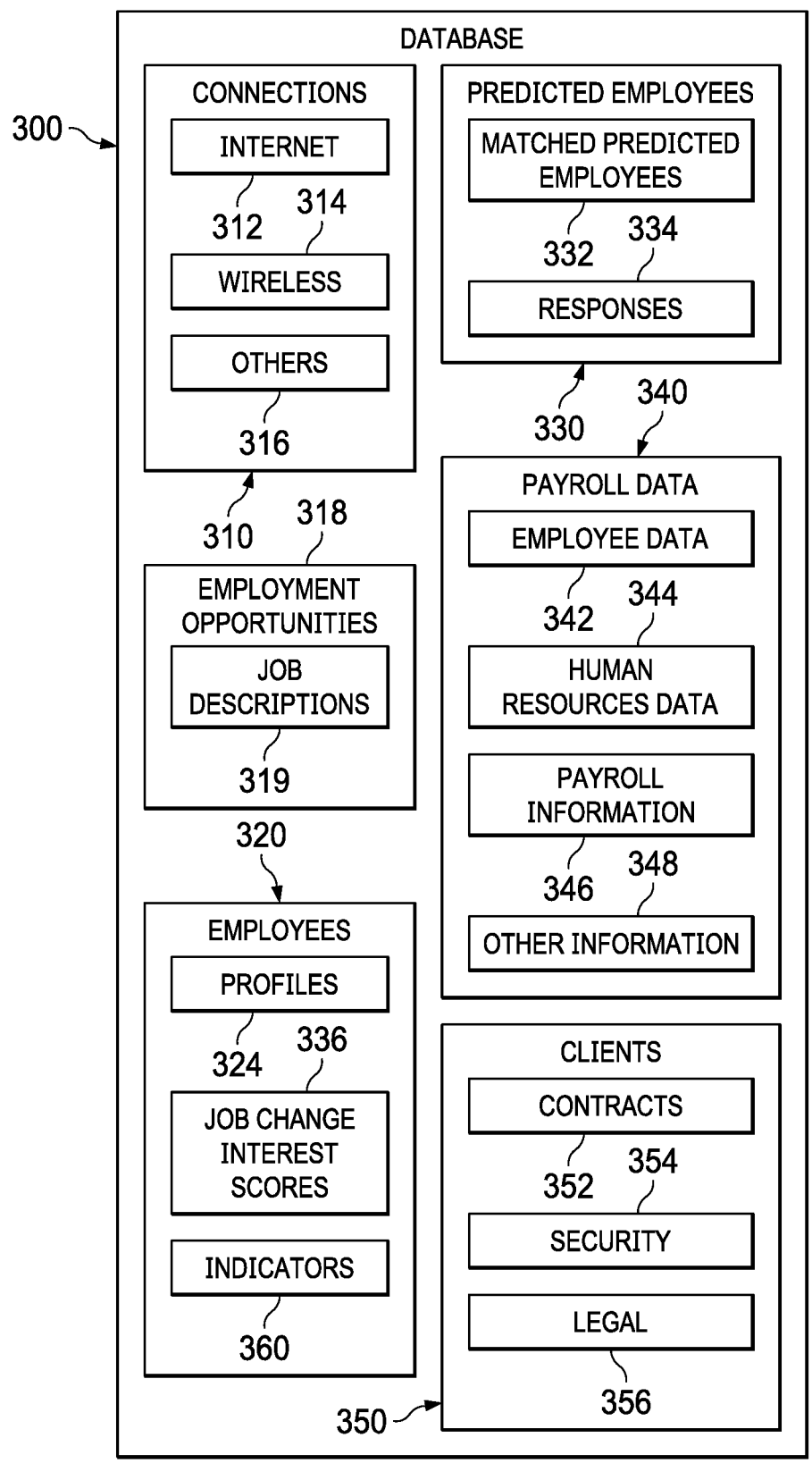
FIG. 3 is a block diagram of a database for a targeted recruiting message system in accordance with an illustrative embodiment.

Predicted employee cache 260 may be configured for access by a messaging application in programs 230 in order to provide up-to-date job change interest scores 336 in FIG. 3 for determining predicted employees 330 in FIG. 3. Display 263 may be used to select programs and configure programs in programs 230. Job change interest models 268 may comprise a number of job change interest models that may be used by machine intelligence 218 to compare data regarding an employee for use in calculating a job change interest score in job change interest scores 336 in FIG. 3. Internet application 235 may be configured for messaging 250 to send job descriptions to matched predicted employees.

Computer system 201 is connected to internal databases 262, external data sources 264, and devices 266. Internal databases 262 may comprise all or part of database 300 in FIG. 3. External data sources 264 may comprise news feeds and other sources of information regarding economic conditions in a geographic area of interest to a recruiter that may be used.

Devices 266 may be devices used to send messages by messaging 250 in programs 230. Messages may regard employment opportunities 318 and job descriptions 319 to predicted employees 330 in FIG. 3.

Turning to FIG. 3, a block diagram of a database of a targeted recruiting message system is depicted in accordance with an illustrative embodiment. Database 300 comprises connections 310, employees 320, employment opportunities 318, clients 350, predicted employees 330, and payroll data 340.

Connections 310 comprise internet 312, wireless 314, and others 316. Connections 310 may provide connectivity with internal databases 262, external data sources 264, and devices 266 shown in FIG. 2. Internet application 235 and wireless 314 may connect with internal databases 262, external data sources 264, and devices 266, shown in FIG. 2, through a network, such as network 102 in FIG. 1.

Employees 320 may comprise all employees for whom payroll data 340 is maintained by a payroll organization in an internal database, such as internal databases 262 in FIG. 2. Employment opportunities 318 may comprise information regarding job openings supplied by clients of a payroll organization employing targeted recruiting message system 200 shown in FIG. 2. Employment opportunities 318 may further comprise job descriptions 319 which may be sent to one or more of matched predicted employees 332 in FIG. 3 by messaging 250 in FIG. 2.

Clients 350 may comprise contracts 352, security 354, and legal 356. Clients 350 may be configured for information regarding clients, such as recruiters who contract with a payroll organization employing targeted recruiting message system 200 shown in FIG. 2. Information regarding contracts with each of clients 350 may be maintained in contracts 352. Information regarding security of data and messaging may be maintained in security 354. Other legal information regarding clients 350 and the payroll organization employing targeted recruiting message system 200 may be maintained in legal 356. Machine intelligence 218 of FIG. 2 may access clients 350 in regard to contract compliance, security compliance, and legal compliance before sending messages via messaging 250 to matched predicted employees 332.

Predicted employees 330 comprise matched predicted employees 332 and responses 334. Predicted employees 330 may be identified by machine intelligence 218 of FIG. 2. One or more of predicted employees 330 matching one or more of job descriptions 319 may be identified in matched predicted employees 332. Matched predicted employees 332 may be stored in predicted employee cache 260 in FIG. 2. Payroll data 340 comprises employee data 342, human resources data 344, payroll information 346, and other information 348.

Indicators 360 may comprise indices of a desire for a job change. Indicators 360 may be used alone or in conjunction with job change interest models 268 in FIG. 2 by a machine intelligence application to calculate one or more job change interest scores stored in job change interest scores 336 in accordance with FIGS. 4-7. Indicators 360 may include a number of indices reflecting a person's desire to change or not change jobs. Such indices may be one or more of a geographic location, an industry of employment, a job title, a tenure, a pay range across geographic boundaries, a desire for upward mobility, a size of family, an education level, and other factors that may affect a qualified employee's desire to change jobs.

Computer system 201 of FIG. 2 solves the technical problem of targeting recruiting messages to interested candidates rather than to candidates who are not likely to consider the job opportunity. Computer system 201 accesses data for employees in a payroll database and compares the data to a job change interest model. Computer system 201 uses machine intelligence 218 to determine whether the employee is a predicted employee. When computer system 201 determines that an employee is a predicted employee, machine intelligence application 218 calculates a job change interest score such as one of job change interest scores 336 in FIG. 3. The job change interest score and the employee name are stored in a predicted employee cache such as predicted employee cache 260. Predicted employee cache 260 may be configured to provide rapid access by a job messaging application. Thus, when computer system 201 receives a job description for an employment opportunity, computer system 201 parses predicted employee cache 260 for one or more employees having employment data matching the job description in the employment opportunity. Computer system 201 can then deliver the employment opportunity to those employees who meet the requirements of the employment opportunity and also those who have been determined to likely have an interest in a job change. Thus, the comparison to the job change model and the calculation of the job change interest score are technical effects that enable computer system 201 to deliver recruiting messages to interested candidates rather than to candidates who are not likely to consider the job opportunity.

Computer system 201 may use one or more programs from programs 230, machine intelligence 218, and information gathering 210 to calculate a job change interest score for an employee. As a result, computer system 201 operates as a special purpose computer system in which programs 230, machine intelligence 218, and information gathering 210 calculate a job change interest score for an employee so that job descriptions for employment opportunities may be sent by message to matched predicted employees 332, with matched predicted employees 332 having a higher probability of applying for the position.

Thus, a targeted recruiting messaging system transforms a computer system into a special purpose computer system as compared to currently available general computer systems that do not have the means to compute a job change interest score derived from payroll database information, such as targeted recruiting message system 200 of FIG. 2, and as further described in FIGS. 3-7. Currently used general computer systems do not reduce the time or effort needed to send job descriptions to interested employees in real-time. Moreover, currently used general computer systems do not provide continuous updating of job change interest scores by machine intelligence as described in FIGS. 2-7.

Figure 4:
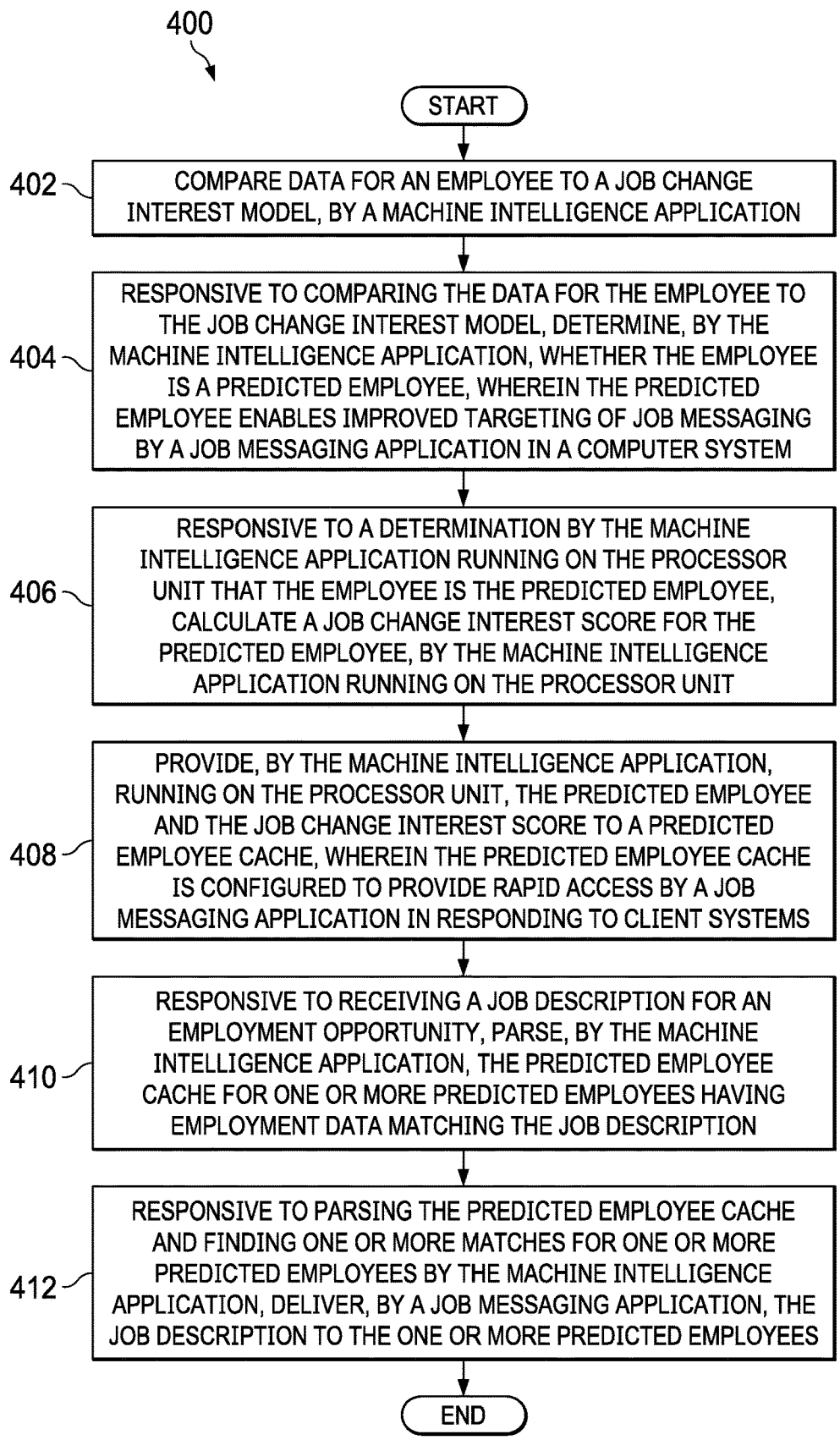
FIG. 4 is a flowchart of a process for identifying a predicted employee using a job change interest score in a targeted recruiting message system in accordance with an illustrative embodiment.

Turning to FIG. 4, a flowchart of a method for on-demand job messaging to predicted employees is depicted in accordance with an illustrative embodiment. Process 400 can be implemented in software, hardware, or a combination of the two. When software is used, the software comprises program code that can be loaded from a storage device and run by a processor unit in a computer system, such as computer system 201 in FIG. 2. Computer system 201 may reside in a network data processing system, such as network data processing system 100 in FIG. 1. For example, computer system 201 may reside on one or more of server computer 104, server computer 106, client computer 110, client computer 112, and client computer 114 connected by network 102 in FIG. 1. Moreover, process 400 can be implemented by data processing system 800 in FIG. 8 and a processing unit, such as processor unit 804 in FIG. 8.

Process 400 starts. A machine intelligence application compares data for an employee to a job change interest model (step 402). The machine intelligence application may be machine intelligence 218 in FIG. 2. The data for the employee may be data from payroll data 340 in FIG. 3. The machine intelligence application may run on a processor unit, such as processor unit 804 in FIG. 8. Responsive to comparing the data for the employee to the job change interest model, the machine intelligence application determines whether the employee is a predicted employee, wherein the predicted employee enables improved targeting of job messaging by a job messaging application in a computer system (step 404). The predicted employee may be stored as one of predicted employees 330 in FIG. 3. Responsive to a determination by the machine intelligence application running on the processor unit that the employee is the predicted employee, the machine intelligence application running on the processor unit calculates a job change interest score for the predicted employee (step 406). The job change interest score may be stored as one of job change interest scores 336 in FIG. 3. The machine intelligence application, running on the processor unit, provides the predicted employee and the job change interest score to a predicted employee cache, wherein the predicted employee cache is configured to provide rapid access by a job messaging application in responding to client systems (step 408). The predicted employee cache may be predicted employee cache 260 in FIG. 2. Predicted employee cache 260 may hold the latest job interest score for a predicted employee in predicted employees 330 in FIG. 3.

Responsive to receiving a job description for an employment opportunity, the machine intelligence application parses the predicted employee cache for one or more predicted employees having employment data matching the job description (step 410). Responsive to parsing the predicted employee cache and finding one or more matches for one or more predicted employees by the machine intelligence application, a job messaging application delivers the job description to the one or more matched predicted employees (step 412). The one or more matched predicted employees may be stored as one or more of matched predicted employees 332 in FIG. 3. The job messaging application may be messaging 250 in programs 230 in FIG. 2. Responses from each matched predicted employee 332 may be stored in responses 330 in FIG. 3. In an illustrative embodiment, the job messaging application may use the job change interest score associated with each matched predicted employee 332 to prioritize delivery of messages to matched predicted employees 332 in order of ranking of job change interest scores 336 in FIG. 3. In another illustrative embodiment, matched predicted employees 332 may be ranked according to each predicted employee's latest job change interest score so that only a number of predicted employees with the highest job change interest scores are stored in predicted employee cache 260 in FIG. 2. Alternatively, only predicted employees having a job change interest score above a threshold score may be stored in predicted employee cache 260 in FIG. 2. Process 400 terminates thereafter.

Figure 5:
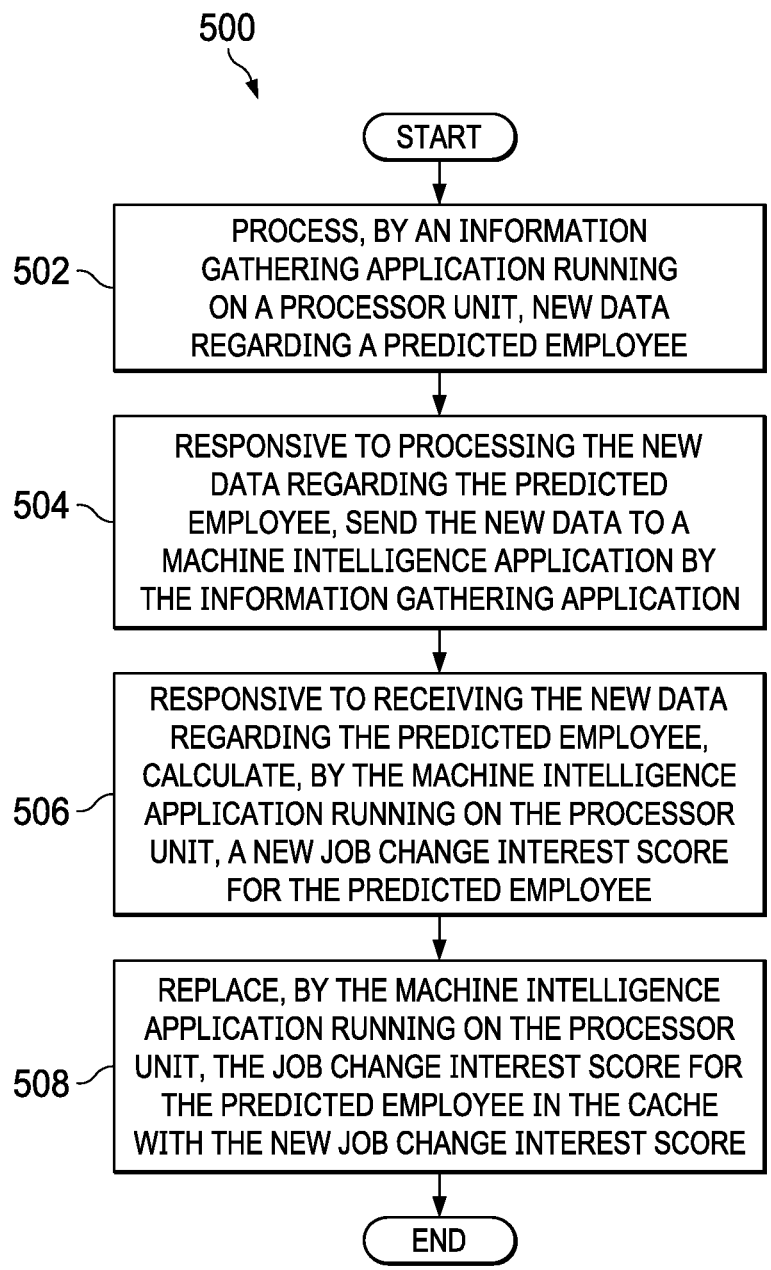
FIG. 5 is a flowchart of a process for updating a job change interest score in a targeted recruiting message system in accordance with an illustrative embodiment.

Turning to FIG. 5, a flowchart of a process for processing new data for predicted employees is depicted in accordance with an illustrative embodiment. Process 500 can be implemented in software, hardware, or a combination of the two. When software is used, the software comprises program code that can be loaded from a storage device and run by a processor unit in a computer system, such as computer system 201 in FIG. 2. Computer system 201 may reside in a network data processing system, such as network data processing system 100 in FIG. 1. For example, computer system 201 may reside on one or more of server computer 104, server computer 106, client computer 110, client computer 112, and client computer 114 connected by network 102 in FIG. 1. Moreover, process 500 can be implemented by data processing system 800 in FIG. 8 and a processing unit, such as processor unit 804 in FIG. 8.

Process 500 starts. An information gathering application, running on a processor unit, processes new data regarding a predicted employee (step 502). The information gathering application may be information gathering 210 in FIG. 2. The new data for the employee may be new data in payroll data 340 in FIG. 3. The information gathering application may run on a processor unit, such as processor unit 804 in FIG. 8.

Responsive to processing the new data regarding the predicted employee, the information gathering application sends the new data to a machine intelligence application (step 504). The machine intelligence application may be machine intelligence 218 in FIG. 2. The machine intelligence application may run on a processor unit, such as processor unit 804 in FIG. 8. In response to receiving the new data regarding the predicted employee, the machine intelligence application running on the processor unit calculates a new job change interest score for the predicted employee (step 506). The new job change interest score may be one of job change interest scores 336 in FIG. 3. The machine intelligence application running on the processor unit replaces the job change interest score for the predicted employee in the cache with the new job change interest score (step 508). The cache may be predicted employee cache 260 in FIG. 2. Process 500 terminates thereafter.

Figure 6:
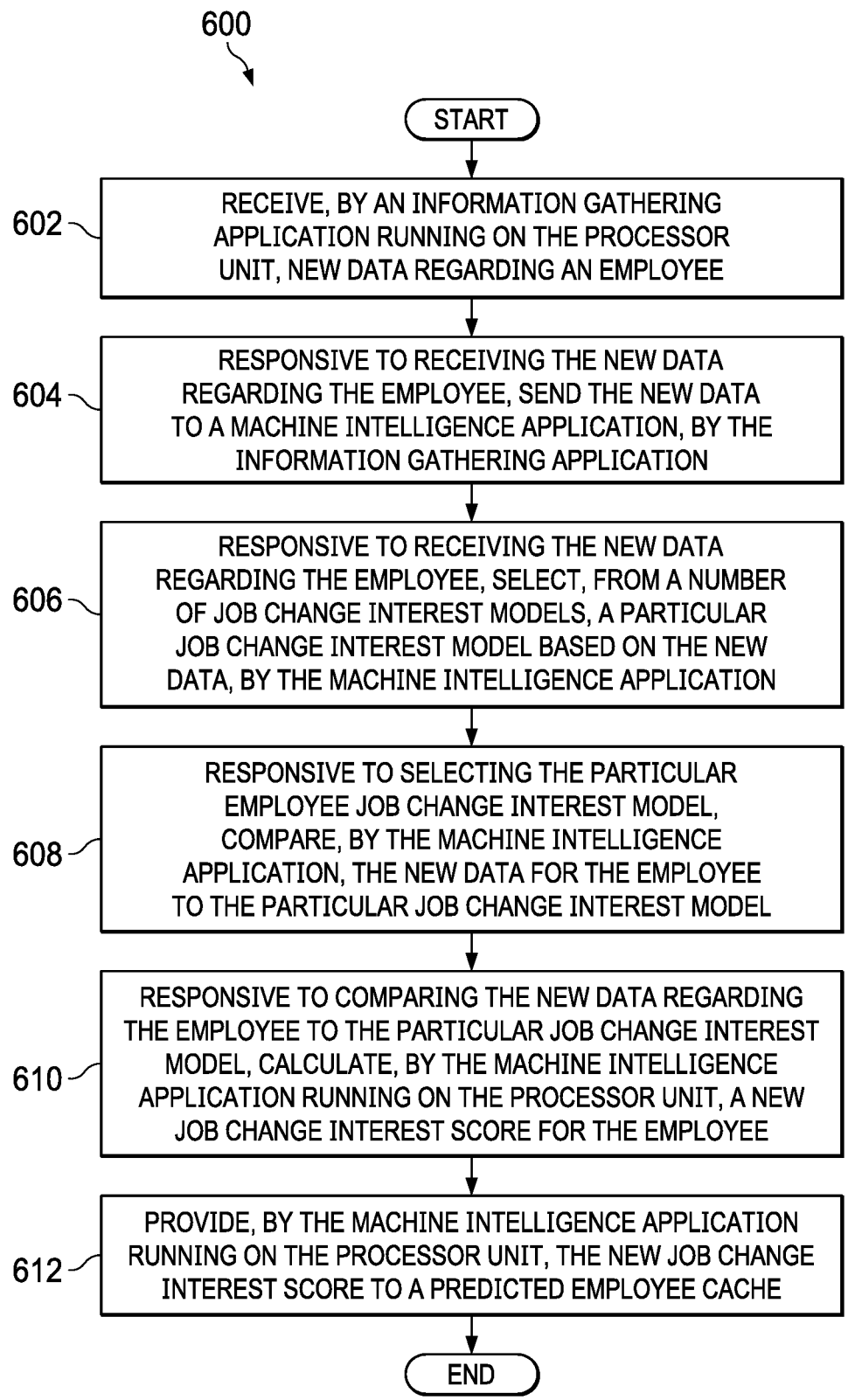
FIG. 6 is a flowchart of a process for selecting a job change interest model in accordance with an illustrative embodiment.

Turning to FIG. 6, a flowchart of a process for selecting a particular model for an employee is depicted in accordance with an illustrative embodiment. Process 600 can be implemented in software, hardware, or a combination of the two. When software is used, the software comprises program code that can be loaded from a storage device and run by a processor unit in a computer system, such as computer system 201 in FIG. 2. Computer system 201 may reside in a network data processing system, such as network data processing system 100 in FIG. 1. For example, computer system 201 may reside on one or more of server computer 104, server computer 106, client computer 110, client computer 112, and client computer 114 connected by network 102 in FIG. 1. Moreover, process 600 can be implemented by data processing system 800 in FIG. 8 and a processing unit, such as processor unit 804 in FIG. 8.

Process 600 starts. An information gathering application, running on a processor unit, receives new data regarding an employee (step 602). The information gathering application may be information gathering 210 in FIG. 2. The new data for the employee may be new data from payroll data 340 in FIG. 3. The information gathering application may run on a processor unit, such as processor unit 804 in FIG. 8. Responsive to receiving the new data regarding the employee, the information gathering application sends the new data to a machine intelligence application (Step 604). The machine intelligence application may be machine intelligence 218 in FIG. 2. In response to receiving the new data regarding the employee, the machine intelligence application selects, from a number of job change interest models, a particular job change interest model based on the new data (step 606). The number of job change interest models may be job change interest models 268 in FIG. 2.

In response to selecting the particular job change interest model, the machine intelligence application compares the new data for the employee to the particular job change interest model (step 608). In response to comparing the new data regarding the employee to the particular job change interest model, the machine intelligence application, running on the processor unit, calculates a new job change interest score for the employee (step 610). The machine intelligence application may calculate the new job change interest score by using any number of methods. In an illustrative embodiment, the machine intelligence application may use process 700 of FIG. 7. The machine intelligence application, running on the processor unit, provides the new job change interest score to a predicted employee cache (step 612). The predicted employee cache may be predicted employee cache 260 in FIG. 2. Process 600 terminates thereafter.

Figure 7:
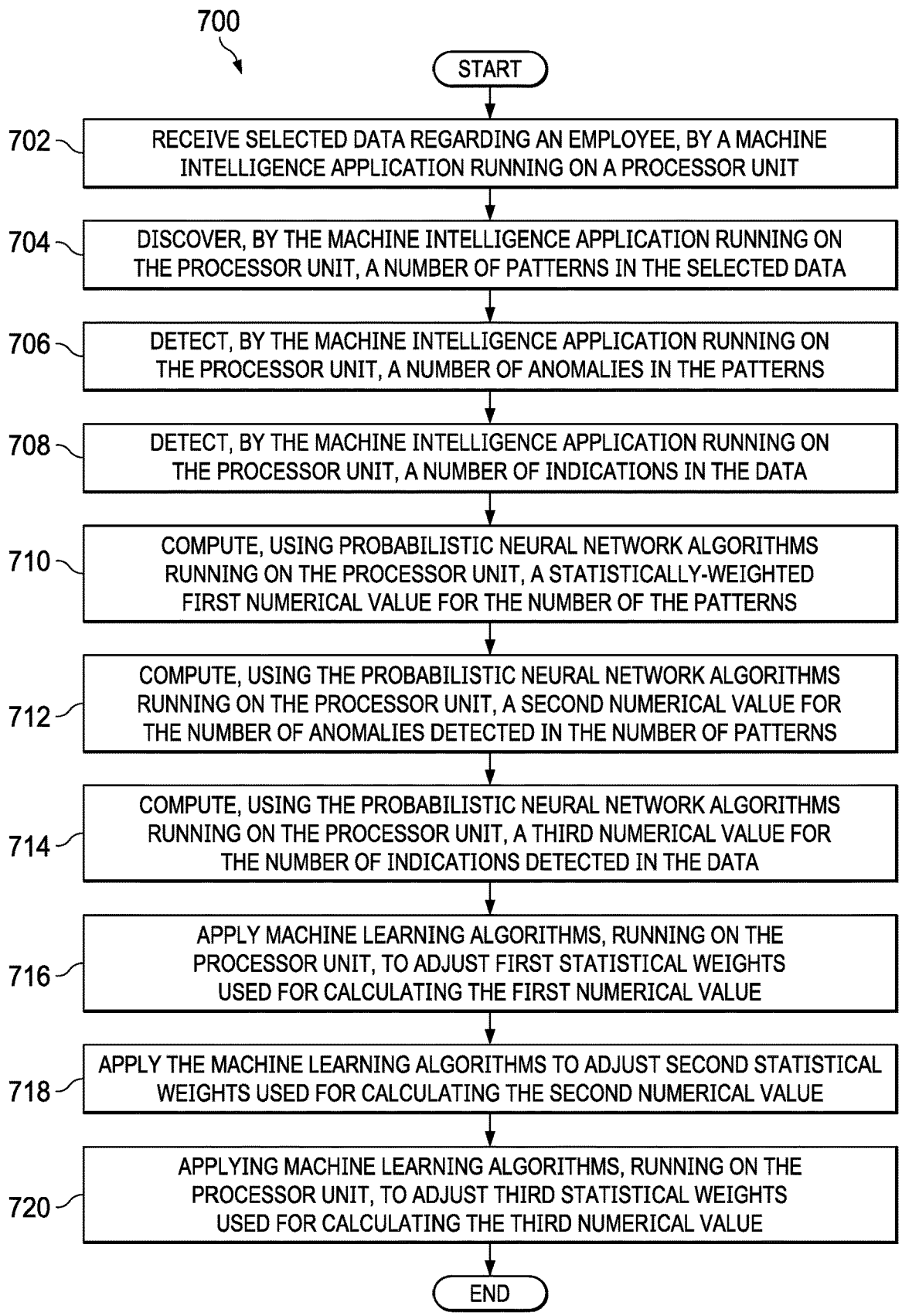
FIG. 7 is a flowchart of a machine intelligence application process for providing a job change interest score in a targeted recruiting message system in accordance with an illustrative embodiment.

Turning to FIG. 7, a flowchart of a process for calculating a job change interest score is depicted in accordance with an illustrative embodiment. Process 700 can be implemented in software, hardware, or a combination of the two. When software is used, the software comprises program code that can be loaded from a storage device and run by a processor unit in a computer system, such as computer system 201 in FIG. 2. Computer system 201 may reside in a network data processing system, such as network data processing system 100 in FIG. 1. For example, computer system 201 may reside on one or more of server computer 104, server computer 106, client computer 110, client computer 112, and client computer 114 connected by network 102 in FIG. 1. Moreover, process 700 can be implemented by data processing system 800 in FIG. 8 and a processing unit, such as processor unit 804 in FIG. 8.

Process 700 starts. A machine intelligence application, running on a processor unit, receives selected data regarding an employee (step 702). The machine intelligence application may be machine intelligence 218 in FIG. 2. The selected data for the employee may be data from payroll data 340 in FIG. 3. The machine intelligence application may run on a processor unit, such as processor unit 804 in FIG. 8. The machine intelligence application, running on the processor unit, discovers a number of patterns in the selected data (step 704). The machine intelligence application, running on the processor unit, detects a number of anomalies in the number of patterns (step 706). The machine intelligence application, running on the processor unit, detects a number of indications in the data (step 708). The number of indications may be one or more of employment and human resource lifecycle changes, individual information data changes, role changes, a device registration, financial data, and employment data including employment status and history.

The machine intelligence application computes, using probabilistic neural network algorithms running on the processor unit, a statistically-weighted first numerical value for the number of the patterns (step 710). The machine intelligence application computes, using the probabilistic neural network algorithms running on the processor unit, a second numerical value for the number of anomalies detected in the number of patterns (step 712).

The machine intelligence application computes, using the probabilistic neural network algorithms running on the processor unit, a third numerical value for the number of indications detected in the data (step 714). The machine intelligence application applies machine learning algorithms, running on the processor unit, to adjust first statistical weights used for calculating the first numerical value (step 716). The machine intelligence application applies the machine learning algorithms to adjust second statistical weights used for calculating the second numerical value (step 718). The machine intelligence application applies machine learning algorithms, running on the processor unit, to adjust third statistical weights used for calculating the third numerical value (step 720). Process 700 terminates thereafter. The first numerical data, the second numerical data, and the third numerical data may be used to form a job change interest score such as one of job change interest scores 336 in FIG. 3.

Figure 8:
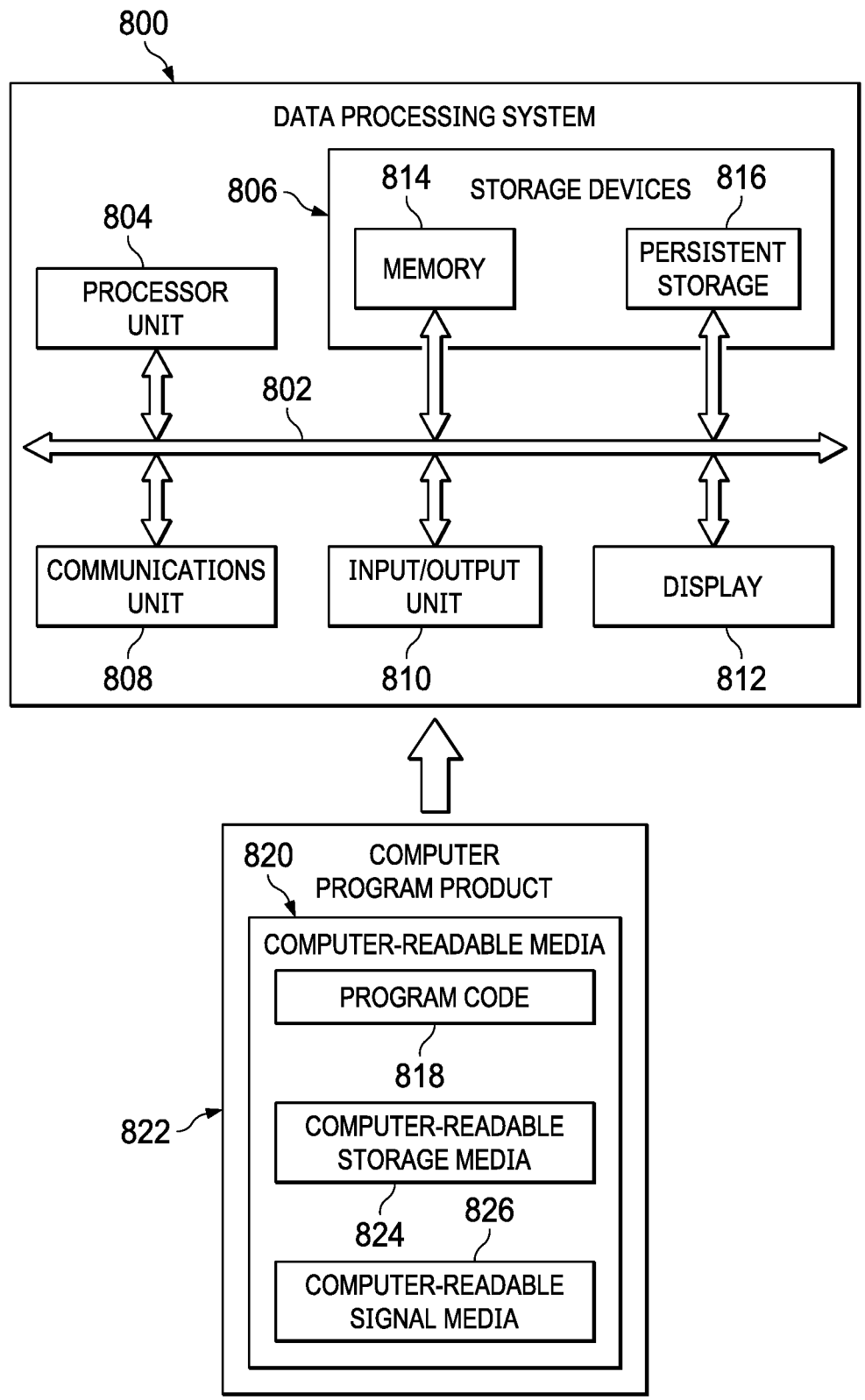
FIG. 8 is a block diagram of a data processing system depicted in accordance with an illustrative embodiment.

Turning now to FIG. 8, an illustration of a block diagram of a data processing system is depicted in accordance with an illustrative embodiment. Data processing system 800 may be used to implement one or more computers and client computer 112 in FIG. 1. In this illustrative example, data processing system 800 includes communications framework 802, which provides communications between processor unit 804, memory 814, persistent storage 816, communications unit 808, input/output unit 810, and display 812. In this example, communications framework 802 may take the form of a bus system.

Processor unit 804 serves to execute instructions for software that may be loaded into memory 814. Processor unit 804 may be a number of processors, a multi-processor core, or some other type of processor, depending on the particular implementation. Memory 814 and persistent storage 816 are examples of storage devices 806. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 806 may also be referred to as computer-readable storage devices in these illustrative examples. Memory 814, in these examples, may be, for example, a random access memory or any other suitable volatile or non-volatile storage device. Persistent storage 816 may take various forms, depending on the particular implementation.

For example, persistent storage 816 may contain one or more components or devices. For example, persistent storage 816 may be a hard drive, a flash memory, a rewritable optical disk, a rewritable magnetic tape, or some combination of the above. The media used by persistent storage 816 also may be removable. For example, a removable hard drive may be used for persistent storage 816. Communications unit 808, in these illustrative examples, provides for communications with other data processing systems or devices. In these illustrative examples, communications unit 808 is a network interface card.

Input/output unit 810 allows for input and output of data with other devices that may be connected to data processing system 800. For example, input/output unit 810 may provide a connection for user input through at least of a keyboard, a mouse, or some other suitable input device. Further, input/output unit 810 may send output to a printer. Display 812 provides a mechanism to display information to a user.

Instructions for at least one of the operating system, applications, or programs may be located in storage devices 806, which are in communication with processor unit 804 through communications framework 802. The processes of the different embodiments may be performed by processor unit 804 using computer-implemented instructions, which may be located in a memory, such as memory 814.

These instructions are referred to as program code, computer-usable program code, or computer-readable program code that may be read and executed by a processor in processor unit 804. The program code in the different embodiments may be embodied on different physical or computer-readable storage media, such as memory 814 or persistent storage 816.

Program code 818 is located in a functional form on computer-readable media 820 that is selectively removable and may be loaded onto or transferred to data processing system 800 for execution by processor unit 804. Program code 818 and computer-readable media 820 form computer program product 822 in these illustrative examples. In one example, computer-readable media 820 may be computer-readable storage media 824 or computer-readable signal media 826.

In these illustrative examples, computer-readable storage media 824 is a physical or tangible storage device used to store program code 818 rather than a medium that propagates or transmits program code 818. Alternatively, program code 818 may be transferred to data processing system 800 using computer-readable signal media 826.

Computer-readable signal media 826 may be, for example, a propagated data signal containing program code 818. For example, computer-readable signal media 826 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 800 are not meant to provide architectural limitations to the manner in which different embodiments may be implemented. The different illustrative embodiments may be implemented in a data processing system including components, in addition to or in place of those illustrated, for data processing system 800. Other components shown in FIG. 8 can be varied from the illustrative examples shown. The different embodiments may be implemented using any hardware device or system capable of running program code 818.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

In an illustrative embodiment, a computer-implemented method provides on-demand job messaging to predicted employees. The computer-implemented method comprises comparing, by a machine intelligence application, data for an employee to a job change interest model. Responsive to comparing the data for the employee to the job change interest model, the method determines whether the employee is a predicted employee, wherein the predicted employee enables improved targeting of job messaging by a job messaging application in a computer system.

Responsive to a determination by the machine intelligence application running on the processor unit that the employee is the predicted employee, the computer-implemented method further comprises calculating, by the machine intelligence application running on the processor unit, a job change interest score for the predicted employee. The computer-implemented method provides, by the machine intelligence application running on the processor unit, the job change interest score to a predicted employee cache.

Responsive to receiving a job description for an employment opportunity, the computer-implemented method parses the predicted employee cache for one or more predicted employees having employment data matching the job description. Responsive to parsing the predicted employee cache and finding one or more matches for one or more of the predicted employees, the computer-implemented method sends the job description to one or more of the predicted employees.

Thus, in one illustrative embodiment, one or more technical solutions are present that overcome a technical problem in the area of messaging job descriptions to only those employees having an interest in a job change. The employee interest in the job change may be reflected in a job change interest score calculated from data from a payroll database, one or more job change interest models, a number of indicators or indices, and by a machine intelligence that continually updates the job change interest score to a job change interest score cache for real-time deployment of job descriptions to predicted employees.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component may be configured to perform the action or operation described. For example, the component may have a configuration or design for a structure that provides the component an ability to perform the action or operation that is described in the illustrative examples as being performed by the component.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A computer-implemented method for on-demand job messaging to predicted employees, the computer-implemented method comprising:

responsive to receiving, by a machine intelligence application running on a processor unit, a job description for an employment opportunity, parsing a predicted employee cache for one or more of the predicted employees having employment data matching the job description;

responsive to parsing the predicted employee cache and finding one or more matches for one or more of the predicted employees, delivering, by a job messaging application running on the processor unit, the job description to one or more of the predicted employees;

wherein a predicted employee is an employee that the machine intelligence application has determined to be interested in a job change by calculating a job change interest score from payroll data using probabilistic neural network algorithms and to whom the job change interest score has been assigned in the predicted employee caches;

further comprising:

accessing, by the machine intelligence application running on the processor unit, payroll data for a number of employees in a payroll database, wherein the payroll data comprises an address, a salary, a date of employment by a current organization, dates for each pay raise, dates for each promotion, a geographic location, a total time with the current organization, data regarding dates of prior employment before joining the current organization, an employment history, gaps in the employment history, payroll deductions, and an amount of salary contributions to retirement savings;

responsive to accessing the data for the number of employees in the payroll database, comparing, by the machine intelligence application running on the processor unit, the payroll data for the employee to a job change interest model;

responsive to comparing the data for the employee to the job change interest model, determining, by the machine intelligence application running on the processor unit, that the employee is the predicted employee by calculating, by the machine intelligence application running on the processor unit, the job change interest score for the predicted employee, wherein calculating the job change interest score, further comprises:

discovering, by the machine intelligence application running on the processor unit, a number of patterns in the data, including computing, using the probabilistic neural network algorithms running on the processor unit, a statistically-weighted first numerical value for the number of the patterns;

detecting, by the machine intelligence application running on the processor unit, a number of anomalies in the number of patterns, including computing, using the probabilistic neural network algorithms running on the processor unit, a second numerical value for the number of anomalies detected in the number of patterns; and detecting, by the machine intelligence application running on the processor unit, a number of indications in the data, including computing, using the probabilistic neural network algorithms running on the processor unit, a third numerical value for the number of indications detected in the data; and responsive to determining that the employee is the predicted employee, assigning, by the machine intelligence application running on the processor unit, the predicted employee and the job change interest score to the predicted employee cache, wherein the job change interest score is associated with the predicted employee in the predicted employee cache.

2. The computer-implemented method of claim 1, wherein the predicted employee cache is configured to provide access by the job messaging application in responding to client systems.

3. The computer-implemented method of claim 1, further comprising:

processing, by an information gathering application running on the processor unit, new data regarding the predicted employee;

responsive to processing the new data regarding the predicted employee, sending the new data to the machine intelligence application;

responsive to receiving the new data regarding the predicted employee, calculating, by the machine intelligence application running on the processor unit, a new job change interest score for the employee; and replacing, by the machine intelligence application running on the processor unit, the job change interest score for the predicted employee in the predicted employee cache with the new job change interest score.

4. The computer-implemented method of claim 1, further comprising:

receiving, by an information gathering application running on the processor unit, new data regarding the employee;

responsive to receiving the new data regarding the employee, sending the new data to the machine intelligence application;

responsive to receiving the new data regarding the employee, selecting, from a number of job change interest models, a particular employee job change interest model based on the new data; and responsive to selecting the particular employee job change interest model, comparing, by the machine intelligence application, the new data for the employee to the particular employee job change interest model.

5. The computer-implemented method of claim 4, further comprising:

responsive to comparing the new data regarding the employee to the particular employee job change interest model, calculating, by the machine intelligence application running on the processor unit, a new job change interest score for the employee; and providing, by the machine intelligence application running on the processor unit, the new job change interest score to the predicted employee cache.

6. The computer-implemented method of claim 1, further comprising:

applying machine learning algorithms, running on the processor unit, to adjust first statistical weights used for calculating the statistically-weighted first numerical value;

applying the machine learning algorithms to adjust second statistical weights used for calculating the second numerical value; and applying machine learning algorithms, running on the processor unit, to adjust third statistical weights used for calculating the third numerical value.

7. The computer-implemented method of claim 1, wherein the number of indications comprises employment and human resource lifecycle changes, individual information data changes, role changes, a device registration, financial data, and employment data including employment status and history.

8. A computer system for on-demand job messaging to predicted employees, the computer system comprising:

a processor unit having a predicted employee cache;

a data base connected to the processor unit;

a number of models stored in a computer-readable storage medium connected to the processor unit;

a job messaging application stored in the computer-readable storage medium;

a machine intelligence application running on the processor unit that compares data for an employee to a job change interest model selected from the number of models, responsive to comparing the data for the employee to the job change interest model, determines whether the employee is a predicted employee by calculating a job change interest score from payroll data using probabilistic neural network algorithms; and responsive to determining that the employee is a predicted employee, stores the predicted employee in the predicted employee cache;

wherein determining the predicted employee enables targeting of the on-demand job messaging by the job messaging application in the computer system;

further comprising:

accessing, by the machine intelligence application running on the processor unit, payroll data for a number of employees in a payroll database, wherein the payroll data comprises an address, a salary, a date of employment by a current organization, dates for each pay raise, dates for each promotion, a geographic location, a total time with the current organization, data regarding dates of prior employment before joining the current organization, an employment history, gaps in the employment history, payroll deductions, and an amount of salary contributions to retirement savings;

responsive to accessing the data for the number of employees in the payroll database, comparing, by the machine intelligence application running on the processor unit, the payroll data for the employee to a job change interest model;

responsive to comparing the data for the employee to the job change interest model, determining, by the machine intelligence application running on the processor unit, that the employee is the predicted employee by calculating, by the machine intelligence application running on the processor unit, the job change interest score for the predicted employee, wherein calculating the job change interest score, further comprises:

discovering, by the machine intelligence application running on the processor unit, a number of patterns in the data, including computing, using the probabilistic neural network algorithms running on the processor unit, a statistically-weighted first numerical value for the number of the patterns;

detecting, by the machine intelligence application running on the processor unit, a number of anomalies in the number of patterns, including computing, using the probabilistic neural network algorithms running on the processor unit, a second numerical value for the number of anomalies detected in the number of patterns; and detecting, by the machine intelligence application running on the processor unit, a number of indications in the data, including computing, using the probabilistic neural network algorithms running on the processor unit, a third numerical value for the number of indications detected in the data; and responsive to determining that the employee is the predicted employee, assigning, by the machine intelligence application running on the processor unit, the predicted employee and the job change interest score to the predicted employee cache, wherein the job change interest score is associated with the predicted employee in the predicted employee cache.

9. The computer system of claim 8, wherein the machine intelligence application, running on the processor unit, calculates a job change interest score for the predicted employee; and provides the job change interest score to the predicted employee cache.

10. The computer system of claim 9, wherein, responsive to receiving a job description for an employment opportunity, the machine intelligence application parses the predicted employee cache for one or more of the predicted employees having employment data matching the job description; and responsive to parsing the predicted employee cache and finding one or more matches for one or more of the predicted employees, sends the job description to the one or more of the predicted employees.

11. The computer system of claim 10, wherein the machine intelligence application, running on the processor unit, discovers a number of patterns in the data; detects a number of anomalies in the number of patterns; and detects a number of indications in the data.

12. The computer system of claim 11, wherein the machine intelligence application computes, using probabilistic neural network algorithms running on the processor unit, a statistically-weighted first numerical value for the number of the patterns; computes, using the probabilistic neural network algorithms running on the processor unit, a second numerical value for the number of anomalies detected in the number of patterns; and computes, using the probabilistic neural network algorithms running on the processor unit, a third numerical value for the number of indications detected in the data.

13. The computer system of claim 12, wherein the machine intelligence application applies machine learning algorithms to adjust first statistical weights used for calculating the statistically-weighted first numerical value; applies the machine learning algorithms to adjust second statistical weights used for calculating the second numerical value;

and applies machine learning algorithms to adjust third statistical weights used for calculating the third numerical value.

14. A computer program product for on-demand job messaging to predicted employees comprising:

computer-readable instructions stored on a non-transitory computer-readable medium and configured to cause a processor unit to compare, by a machine intelligence application, data for an employee to a job change interest model;

computer-readable instructions configured to cause the processor unit, responsive to comparing the data for the employee to the job change interest model, to determine whether the employee is a predicted employee;

computer-readable instructions configured to cause the processor unit, responsive to a determination by the machine intelligence application running on the processor that the employee is the predicted employee, to calculate a job change interest score from payroll data for the predicted employee using probabilistic neural network algorithms; and computer-readable instructions configured to cause the processor unit to provide the job change interest score to a predicted employee cache;

wherein determining the predicted employee enables targeting of the on-demand job messaging by a job messaging application in a computer system;

computer-readable instruction configured to cause accessing, by the machine intelligence application running on the processor unit, payroll data for a number of employees in a payroll database, wherein the payroll data comprises an address, a salary, a date of employment by a current organization, dates for each pay raise, dates for each promotion, a geographic location, a total time with the current organization, data regarding dates of prior employment before joining the current organization, an employment history, gaps in the employment history, payroll deductions, and an amount of salary contributions to retirement savings;

computer-readable instruction configured to cause responsive to accessing the data for the number of employees in the payroll database, comparing, by the machine intelligence application running on the processor unit, the payroll data for the employee to a job change interest model;

computer-readable instruction configured to cause responsive to comparing the data for the employee to the job change interest model, determining, by the machine intelligence application running on the processor unit, that the employee is the predicted employee by calculating, by the machine intelligence application running on the processor unit, the job change interest score for the predicted employee, wherein calculating the job change interest score, further comprises:

- discovering, by the machine intelligence application running on the processor unit, a number of patterns in the data, including computing, using probabilistic neural network algorithms running on the processor unit, a statistically-weighted first numerical value for the number of the patterns;
- detecting, by the machine intelligence application running on the processor unit, a number of anomalies in the number of patterns, including computing, using the probabilistic neural network algorithms running on the processor unit, a second numerical value for the number of anomalies detected in the number of patterns; and
- detecting, by the machine intelligence application running on the processor unit, a number of indications in the data, including computing, using the probabilistic neural network algorithms running on the processor unit, a third numerical value for the number of indications detected in the data; and responsive to determining that the employee is the predicted employee, assigning, by the machine intelligence application running on the processor unit, the predicted employee and the job change interest score to the predicted employee cache, wherein the job change interest score is associated with the predicted employee in the predicted employee cache.

15. The computer program product of claim 14, further comprising:

computer-readable instructions configured to cause the processor unit to discover a number of patterns in the data;

computer-readable instructions configured to cause the processor unit to detect a number of anomalies in the number of patterns;

computer-readable instructions configured to cause the processor unit to detect a number of indications in the data;

computer-readable instructions configured to cause the processor unit to compute, using probabilistic neural network algorithms running on the processor unit, a statistically-weighted first numerical value for the number of patterns;

computer-readable instructions configured to cause the processor unit to compute, using the probabilistic neural network algorithms running on the processor unit, a second numerical value for the number of anomalies detected in the number of patterns;

computer-readable instructions configured to cause the processor unit to compute, using the probabilistic neural network algorithms running on the processor unit, a third numerical value for the number of indications detected in the data;

computer-readable instructions configured to cause the processor unit to apply machine learning algorithms, running on the processor unit, to adjust first statistical weights used for calculating the statistically-weighted first numerical value;

computer-readable instructions configured to cause the processor unit to apply the machine learning algorithms to adjust second statistical weights used for calculating the second numerical value; and computer-readable instructions configured to cause the processor unit to apply machine learning algorithms, running on the processor unit, to adjust third statistical weights used for calculating the third numerical value.

\* \* \* \* \*